(12) United States Patent
Kwon et al.

(10) Patent No.: US 10,230,644 B2
(45) Date of Patent: Mar. 12, 2019

(54) DISTRIBUTED API PROXY SYSTEM AND APPARATUS AND METHOD FOR MANAGING TRAFFIC IN SUCH SYSTEM

(71) Applicant: SAMSUNG SDS CO., LTD., Seoul (KR)

(72) Inventors: Soon-Mok Kwon, Seoul (KR); Yong-Keun Yun, Seoul (KR); Dong-Ho Yoo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 161 days.

(21) Appl. No.: 14/726,703

(22) Filed: Jun. 1, 2015

(65) Prior Publication Data
US 2015/0350092 A1 Dec. 3, 2015

(30) Foreign Application Priority Data
May 30, 2014 (KR) .................. 10-2014-0065571

(51) Int. Cl.
*H04L 12/26* (2006.01)
*H04L 12/815* (2013.01)
(Continued)

(52) U.S. Cl.
CPC ............ *H04L 47/22* (2013.01); *H04L 41/083* (2013.01); *H04L 43/08* (2013.01); *H04L 47/125* (2013.01);
(Continued)

(58) Field of Classification Search
CPC ...... H04L 47/22; H04L 47/125; H04L 47/788; H04L 67/145; H04L 67/2842;
(Continued)

(56) References Cited

U.S. PATENT DOCUMENTS 7,822,837 B1 * 10/2010 Urban ................ H04L 41/5009
709/223
8,001,555 B2 * 8/2011 Hellenthal ............. H04L 29/06
719/328

(Continued)

OTHER PUBLICATIONS

Gubbi J, Buyya R, Marusic S, Palaniswami M. Internet of Things (IoT): A vision, architectural elements, and future directions. Future Generation Computer Systems. Sep. 30, 2013;29(7):1645-60.*

(Continued)

*Primary Examiner* — Ranodhi Serrao
*Assistant Examiner* — James N Fiorillo
(74) *Attorney, Agent, or Firm* — Sughrue Mion, PLLC

(57) ABSTRACT

Disclosed are a distributed application programming interface (API) proxy system and an apparatus and method for managing traffic in the system. The apparatus for managing API traffic includes a traffic information collection unit configured to collect traffic information from a plurality of API proxies distributed to a plurality of networked apparatuses such that physical resources are abstracted to provide access to the abstracted physical resources and a traffic optimization unit configured to generate control information for decreasing communication traffic of at least one of the plurality of API proxies based on the collected traffic information and deliver the generated control information to the plurality of API proxies.

26 Claims, 6 Drawing Sheets

(51) Int. Cl.
*H04L 12/803* (2013.01)
*H04L 29/08* (2006.01)
*H04L 12/24* (2006.01)

(52) U.S. Cl.
CPC .......... *H04L 67/10* (2013.01); *H04L 67/1095* (2013.01); *H04L 67/28* (2013.01); *H04L 67/2804* (2013.01); *H04L 43/0864* (2013.01); *H04L 43/0894* (2013.01)

(58) Field of Classification Search
CPC ......... H04L 67/06; H04L 67/10; H04L 67/12; H04L 67/16; H04L 67/28; H04L 67/42; H04L 67/1031; G06F 9/507
USPC ................................. 709/204, 219–226, 238
See application file for complete search history.

(56) References Cited

U.S. PATENT DOCUMENTS

| | | | | |
|---|---|---|---|---|
| 9,310,864 | B1* | 4/2016 | Klein | G06F 1/26 |
| 9,460,008 | B1* | 10/2016 | Leshinsky | G06F 17/30185 |
| 9,515,914 | B2* | 12/2016 | Vasseur | H04L 45/42 |
| 2005/0246453 | A1* | 11/2005 | Erlingsson | G06F 9/4555 |
| | | | | 710/1 |
| 2006/0031653 | A1* | 2/2006 | Todd | G06F 3/0622 |
| | | | | 711/170 |
| 2006/0146703 | A1* | 7/2006 | Cha | H04L 29/06027 |
| | | | | 370/229 |
| 2008/0130520 | A1* | 6/2008 | Ebrom | G06F 9/54 |
| | | | | 370/254 |
| 2009/0066534 | A1* | 3/2009 | Sivakkolundhu | H04L 12/281 |
| | | | | 340/4.32 |
| 2009/0327514 | A1* | 12/2009 | Foschiano | H04L 45/00 |
| | | | | 709/233 |
| 2010/0318652 | A1* | 12/2010 | Samba | H04L 41/5009 |
| | | | | 709/224 |
| 2010/0325263 | A1* | 12/2010 | Raja | H04L 43/04 |
| | | | | 709/224 |
| 2011/0185082 | A1* | 7/2011 | Thompson | H04W 4/60 |
| | | | | 709/238 |
| 2011/0202589 | A1* | 8/2011 | Piernot | G06F 9/546 |
| | | | | 709/202 |
| 2012/0089727 | A1* | 4/2012 | Raleigh | H04L 12/14 |
| | | | | 709/224 |
| 2012/0096093 | A1* | 4/2012 | Bouw | G06F 9/5061 |
| | | | | 709/206 |
| 2012/0166010 | A1* | 6/2012 | Chou | H04L 12/2818 |
| | | | | 700/296 |
| 2012/0226767 | A1* | 9/2012 | Luna | H04L 67/2842 |
| | | | | 709/216 |
| 2012/0317274 | A1* | 12/2012 | Richter | G06Q 10/06 |
| | | | | 709/224 |
| 2013/0057388 | A1* | 3/2013 | Attanasio | G06Q 50/26 |
| | | | | 340/10.1 |
| 2013/0086245 | A1* | 4/2013 | Lu | H04L 12/2807 |
| | | | | 709/223 |
| 2013/0114466 | A1* | 5/2013 | Koponen | H04L 41/0893 |
| | | | | 370/255 |
| 2013/0132854 | A1* | 5/2013 | Raleigh | G06F 3/0482 |
| | | | | 715/738 |
| 2013/0133041 | A1* | 5/2013 | Magyar | H04L 67/322 |
| | | | | 726/4 |
| 2013/0219415 | A1* | 8/2013 | Jeon | G06F 9/541 |
| | | | | 719/328 |
| 2013/0246944 | A1* | 9/2013 | Pandiyan | G06F 9/54 |
| | | | | 715/760 |
| 2013/0304903 | A1* | 11/2013 | Mick | H04L 43/0817 |
| | | | | 709/224 |
| 2013/0339426 | A1* | 12/2013 | Chen | H04L 67/141 |
| | | | | 709/203 |
| 2014/0047487 | A1* | 2/2014 | Guedalia | H04W 4/70 |
| | | | | 725/80 |
| 2014/0052838 | A1* | 2/2014 | Giacomoni | H04L 41/00 |
| | | | | 709/223 |
| 2014/0081433 | A1* | 3/2014 | Cheong | H04L 12/2809 |
| | | | | 700/90 |
| 2014/0108538 | A1* | 4/2014 | Borzycki | G06F 21/6218 |
| | | | | 709/204 |
| 2014/0250229 | A1* | 9/2014 | Prokopenko | H04L 47/788 |
| | | | | 709/226 |
| 2014/0280581 | A1* | 9/2014 | Hernandez | H04L 29/08072 |
| | | | | 709/204 |
| 2014/0359131 | A1* | 12/2014 | Seed | H04W 4/70 |
| | | | | 709/226 |
| 2015/0071071 | A1* | 3/2015 | Hughes | H04L 47/125 |
| | | | | 370/235 |
| 2015/0081847 | A1* | 3/2015 | Hao | H04L 65/4076 |
| | | | | 709/219 |
| 2015/0142916 | A1* | 5/2015 | Bae | H04W 4/70 |
| | | | | 709/218 |
| 2015/0169340 | A1* | 6/2015 | Haddad | G06F 9/45533 |
| | | | | 718/1 |
| 2015/0201035 | A1* | 7/2015 | Profit | H04L 67/2842 |
| | | | | 709/213 |
| 2015/0220376 | A1* | 8/2015 | Srivastava | G06F 11/327 |
| | | | | 714/37 |
| 2015/0229579 | A1* | 8/2015 | Kosim-Satyaputra | |
| | | | | H04L 67/42 |
| | | | | 709/225 |
| 2015/0289123 | A1* | 10/2015 | Shatzkamer | H04W 4/24 |
| | | | | 455/406 |
| 2015/0312311 | A1* | 10/2015 | Subramanian | G06F 17/3051 |
| | | | | 709/223 |
| 2015/0382333 | A1* | 12/2015 | Seok | H04W 74/0808 |
| | | | | 370/338 |
| 2016/0072727 | A1* | 3/2016 | Leafe | G06F 9/44526 |
| | | | | 709/226 |
| 2016/0085594 | A1* | 3/2016 | Wang | H04L 67/18 |
| | | | | 709/226 |
| 2016/0087933 | A1* | 3/2016 | Johnson | H04W 4/70 |
| | | | | 709/245 |
| 2016/0088023 | A1* | 3/2016 | Handa | G06F 17/30899 |
| | | | | 726/1 |
| 2016/0112256 | A1* | 4/2016 | Papageorgiou | H04L 41/0823 |
| | | | | 709/222 |
| 2016/0246638 | A1* | 8/2016 | Rinta-Aho | G06F 9/5055 |

OTHER PUBLICATIONS

Atzori L, Iera A, Morabito G. The internet of things: A survey. Computer networks. Oct. 28, 2010;54(15):2787-805.*
Lea R, Blackstock M. Smart cities: An iot-centric approach. InProceedings of the 2014 international workshop on web intelligence and smart sensing Sep. 1, 2014 (pp. 1-2). ACM.*
Datta, et al. ("An IoT gateway centric architecture to provide novel M2M services". In Internet of Things (WF-IoT), 2014, Mar. 2014 IEEE World Forum on (pp. 514-519). IEEE.*
Blackstock M, Lea R. IoT interoperability: A hub-based approach. InInternet of Things (IOT), 2014 International Conference on the Oct. 6, 2014 (pp. 79-84). IEEE.*
Wu CL, Liao CF, Fu LC. Service-oriented smart-home architecture based on OSGi and mobile-agent technology. IEEE Transactions on Systems, Man, and Cybernetics, Part C (Applications and Reviews). Mar. 2007;37(2):193-205.*
Costantino L, Buonaccorsi N, Cicconetti C, Mambrini R. Performance analysis of an LTE gateway for the IoT. InWorld of Wireless, Mobile and Multimedia Networks (WoWMoM), 2012 IEEE International Symposium on a Jun. 25, 2012 (pp. 1-6). IEEE.*
Definition of Application Programming Interface From Wikipedia.*
Goldszmidt G, Yemini Y. Distributed management by delegation. InDistributed Computing Systems, 1995., Proceedings of the 15th International Conference on May 30, 1995 (pp. 333-340). IEEE.*
Hadim S, Mohamed N. Middleware: Middleware challenges and approaches for wireless sensor networks. IEEE distributed systems online. Mar. 2006;7(3):1-.1 (Year: 2006).*

(56) References Cited

OTHER PUBLICATIONS

Gubbi J, Buyya R, Marusic S, Palaniswami M. Internet of Things (IoT): A vision, architectural elements, and future directions. Future Generation Computer Systems. Sep. 30, 2013;29(7):1645-60. (Year: 2013).*

Atzori L, Iera A, Morabito G. The internet of things: A survey. Computer networks. Oct. 28, 2010;54(15):2787-805. (Year: 2010).*

Lea R, Blackstock M. Smart cities: An iot-centric approach. InProceedings of the 2014 international workshop on web intelligence and smart sensing Sep. 1, 2014 (pp. 1-2). ACM. (Year: 2014).*

Datta, et al. ("An IoT gateway centric architecture to provide novel M2M services". In Internet of Things (WF-IoT), 2014, Mar. 2014 IEEE World Forum on (pp. 514-519). IEEE (Year: 2014).*

Blackstock M, Lea R. IoT interoperability: A hub-based approach. In Internet of Things (IOT), 2014 International Conference on the Oct. 6, 2014 (pp. 79-84). IEEE (Year: 2014).*

Wu CL, Liao CF, Fu LC. Service-oriented smart-home architecture based on OSGi and mobile-agent technology. IEEE Transactions on Systems, Man, and Cybernetics, Part C (Applications and Reviews). Mar. 2007;37(2):193-205 (Year: 2007).*

Costantino L, Buonaccorsi N, Cicconetti C, Mambrini R. Performance analysis of an LTE gateway for the IoT. InWorld of Wireless, Mobile and Multimedia Networks (WoWMoM), 2012 IEEE International Symposium on a Jun. 25, 2012 (pp. 1-6). IEEE (Year: 2012).*

Definition of Application Programming Interface From Wikipedia (Year: 2017).*

Goldszmidt G, Yemini Y. Distributed management by delegation. InDistributed Computing Systems, 1995., Proceedings of the 15th International Conference on May 30, 1995 (pp. 333-340). IEEE. (Year: 1995).*

\* cited by examiner

DISTRIBUTED API PROXY SYSTEM AND APPARATUS AND METHOD FOR MANAGING TRAFFIC IN SUCH SYSTEM

CROSS-REFERENCE TO RELATED APPLICATION

This application claims priority to and the benefit of Korean Patent Application No. 10-2014-0065571, filed on May 30, 2014, the disclosure of which is incorporated herein by reference in its entirety.

BACKGROUND

1. Field

Disclosed embodiments relate to a distributed application programming interface (API) proxy technique, and more particularly, to a distributed API proxy system and an apparatus and method for managing traffic in such a system.

2. Discussion of Related Art

Recently, a variety of services using automated control systems such as an intelligent building system (IBS) and a smart home system have evolved to provide an integration solution based on an Internet of Things (IoT). There are various requirements for systems that provide services in an IoT environment. For example, such systems are required to have communication performance that has been improved sufficiently to (i) provide an environment (e.g., an integrated development environment (IDE)) for an application developer, (ii) provide an open API that enables a third party to develop an application, (iii) establish a connection with various types of sub-nodes (e.g., a terminal device and a gateway device) in a system through a standard communication protocol (e.g., a building control standard communication protocol such as a building automation and control network (BACnet) and a medical-device-related standard communication protocol such as Health Level 7 (HL7), (iv) have an abstraction function and a data caching function for physical resources, (v) provide more detailed visibility to the system, and (vi) process increased traffic.

However, the system visibility and communication performance supported by the existing solutions are not sufficiently satisfied. In particular, limitations due to an increase in traffic associated with sub-nodes are generally overcome through additional network installation or hardware upgrade, resulting in an increase in the system installation cost. Accordingly, improved techniques are needed to overcome such limitations.

SUMMARY

Disclosed embodiments provide a distributed API proxy system and an apparatus and method for managing traffic in such a system.

According to an aspect of the present disclosure, there is provided an apparatus for managing application programming interface (API) traffic, the apparatus including: a traffic information collection unit configured to collect traffic information from a plurality of API proxies distributed to a plurality of networked apparatuses such that physical resources are abstracted to provide access to the abstracted physical resources; and a traffic optimization unit configured to generate control information for decreasing communication traffic of at least one of the plurality of API proxies based on the collected traffic information and deliver the generated control information to the plurality of API proxies.

The traffic optimization unit may generate the control information based on the collected traffic information such that a second API proxy among the plurality of API proxies abstracts a first physical resource accessible by a first API proxy among the plurality of API proxies.

After the second API proxy abstracts the first physical resource, the first API proxy and the second API proxy are synchronized regarding the first physical resource.

The collected traffic information may include an occurrence frequency of a request delivered to the first API proxy in order to access the first physical resource.

The traffic optimization unit may generate the control information when the occurrence frequency exceeds a processing capacity of the first API proxy.

The traffic optimization unit may generate the control information based on the collected traffic information such that a synchronization policy of each of at least two API proxies among the plurality of API proxies is reset for a first physical resource synchronized between the at least two API proxies.

The collected traffic information may include a performance measurement of traffic caused by the synchronization.

The performance measurement may include at least one of a bandwidth, a round trip time (RTT), and an occurrence frequency of the traffic.

The synchronization policy may include selecting a scheme of performing the synchronization, and the selected scheme may include an active scheme of directly requesting data associated with the first physical resource, a passive scheme of awaiting delivery of the data, or a hybrid scheme of the active scheme and the passive scheme.

Each of the plurality of API proxies may include a data plane API that provides an API applicable to the access and a control plane API that provides an API applicable to the collection of the traffic information and the delivery of the control information.

The control information may be used to reset at least one of a physical resource accessible by each of the plurality of API proxies, a synchronization target for the accessible physical resource, and a synchronization policy for the accessible physical resource.

According to another aspect of the present disclosure, there is provided a method of managing distributed API proxy traffic, the method including: collecting traffic information from a plurality of API proxies distributed to a plurality of networked apparatuses such that physical resources are abstracted to provide access to the abstracted physical resources; generating control information for decreasing communication traffic of at least one of the plurality of API proxies based on the collected traffic information; and delivering the generated control information to the plurality of API proxies.

The generating may include generating the control information based on the collected traffic information such that a second API proxy among the plurality of API proxies abstracts a first physical resource accessible by a first API proxy among the plurality of API proxies.

After the second API proxy abstracts the first physical resource, the first API proxy and the second API proxy are synchronized regarding the first physical resource.

The collected traffic information may include an occurrence frequency of a request delivered to the first API proxy in order to access the first physical resource.

The control information may be generated when the occurrence frequency exceeds a processing capacity of the first API proxy.

The generating may include generating the control information based on the collected traffic information such that a synchronization policy of each of at least two API proxies among the plurality of API proxies is reset for a first physical resource synchronized between the at least two API proxies.

The collected traffic information may include a performance measurement of traffic caused by the synchronization.

The performance measurement may include at least one of a bandwidth, a round trip time (RTT), and an occurrence frequency of the traffic.

The synchronization policy may include selecting a scheme of performing the synchronization, and the selected scheme may include an active scheme of directly requesting data associated with the first physical resource, a passive scheme of awaiting delivery of the data, or a hybrid scheme of the active scheme and the passive scheme.

Each of the plurality of API proxies may include a data plane API that provides an API applicable to the access and a control plane API that provides an API applicable to the collection of the traffic information and the delivery of the control information.

The control information may be used to reset at least one of a physical resource accessible by each of the plurality of API proxies, a synchronization target for the accessible physical resource, and a synchronization policy for the accessible physical resource.

According to still another aspect of the present disclosure, there is provided a computer-readable storage medium storing a computer program for executing any one of the above methods.

According to yet still another aspect of the present disclosure, there is provided a distributed API proxy system including: a plurality of API proxies distributed to a plurality of networked apparatuses such that physical resources are abstracted to provide access to the abstracted physical resources; and an API traffic manager configured to collect traffic information from the plurality of API proxies, generate control information for decreasing communication traffic of at least one of the plurality of API proxies based on the collected traffic information, and deliver the generated control information to the plurality of API proxies.

The API traffic manager may be disposed in one of the plurality of networked apparatuses.

The plurality of networked apparatuses may be associated with an Internet of Things (IoT).

The plurality of networked apparatuses may include: a gate device communicably connected with a back-end device; and a terminal device communicably connected with the gateway device and communicably connected with the back-end device through the gate device.

The plurality of networked apparatuses may further include the back-end device.

The API traffic manager may be disposed in the back-end device.

The plurality of networked apparatuses may further include an intermediate device communicably connected with the gateway device and the terminal device and communicably connected with the back-end device through the gateway device, the intermediate device may have a higher computing capability than the terminal device, and the API traffic manager may be disposed in the intermediate device.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the accompanying drawings. The following detailed description will be provided for better understanding of a method, an apparatus, and/or a system that are disclosed in this specification. However, this is merely exemplary, and the present disclosure is not limited thereto.

In describing embodiments of the present disclosure, when it is determined that detailed description of known techniques associated with the present disclosure would unnecessarily obscure the gist of the present disclosure, the detailed description thereof will be omitted. Also, the terms described below are defined in consideration of the functions in the present disclosure, and thus may vary depending on a user, intention of an operator, or custom. Accordingly, the terms will be defined based on the whole specification. The terminology used herein is for the purpose of only describing embodiments of the present disclosure, and should not be restrictive. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
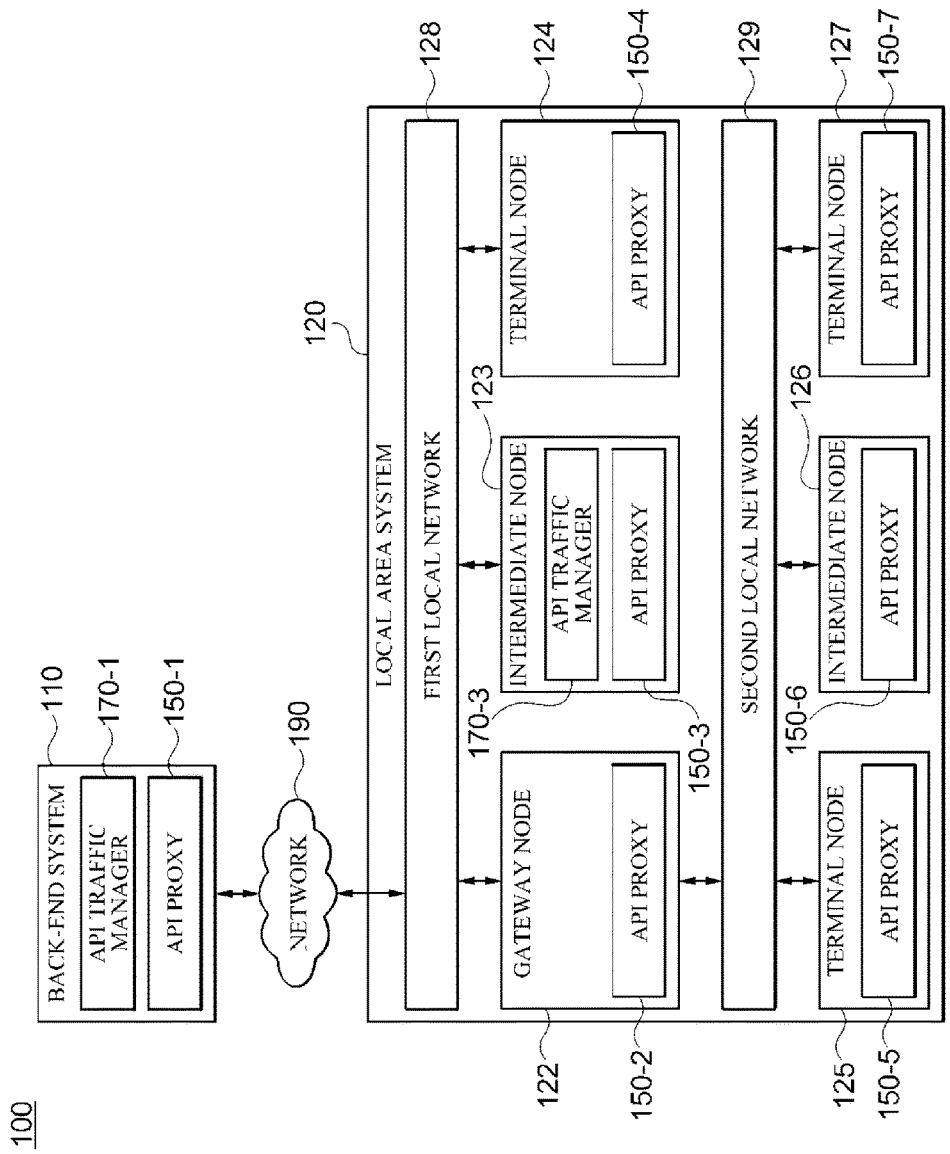
FIG. 1 is a diagram showing a network environment in which a distributed API proxy system may be implemented according to an exemplary embodiment.

FIG. 1 is a diagram showing a network environment in which a distributed API proxy system may be implemented according to an exemplary embodiment.

An exemplary network environment 100 includes a back-end system 110 and a local area system 120. The exemplary network environment 100 may be an Internet of Things (IoT) environment that interconnects identifiable objects (including physical resources). The back-end system 110 and the local area system 120 communicate with each other over a network 190 such as the Internet. The back-end system 110 includes a computing device such as a server device installed in an infrastructure such as a data center. The local area system 120, which may be regarded as a sub-system of the network environment 100 when compared to the back-end system 110, includes nodes (e.g., a gateway node 122, terminal nodes 124, 125, and 127, and intermediate nodes 123 and 126) that are interconnected over at least one network (e.g., a first local network 128 and a second local network 129 of FIG. 1)). The gateway node 122 may be connected with the back-end system 110 over the network 190. The terminal nodes 124, 125, and 127 and the intermediate nodes 123 and 126 may be connected with the gateway node 122 over the first local network 128 or second local network 129 and may be connected with the back-end system 110 through the gateway node 122. The nodes of the local area system 120 may be included or implemented in a physical device having a computing capability. For example, an apparatus having the intermediate node 123 implemented therein may have a higher computing capability (i.e. an ability to process instructions at a higher rate, such as a higher "instructions per second" (IPS) rate) than an apparatus having any other node of the local area system 120 implemented therein.

According to an exemplary embodiment, a distributed API proxy system including a plurality of API proxies distributed to a plurality of networked apparatuses may be implemented in the network environment 100. Referring to FIG. 1, it can be seen that a plurality of API proxies 150-1 to 150-7 are arranged in the network environment 100. Specifically, the API proxy 150-1 may be included in the back-end system 110, and the API proxies 150-2 to 150-7 may be included in the nodes 122 to 127 of the local area system 120, respectively. Each of the plurality of API proxies 150-1 to 150-7 may abstract a physical resource and perform data caching on the abstracted resource. For example, such an API proxy may perform an abstraction operation of converting a physical resource for adjusting a damper position of air handling equipment into an expression that can be interpreted by a computer and may perform a data caching operation of storing a recent damper position value. Furthermore, each of the plurality of API proxies 150-1 to 150-7 may be configured to provide an access to the abstracted physical resource. Through such as access, an application of a user may read and/or record data associated with the abstracted physical resource.

If the number of requests for access to the abstracted physical resource increases rapidly or an error occurs in the local area system 120, a user or administrator may misrecognize that a communication failure has occurred. However, in order to prevent this limitation, an exemplary distributed API proxy system further includes at least one API traffic manager. For example, as shown in FIG. 1, an API traffic manager 170-1 may be included in the back-end system 110, and an API manager 170-3 may be included in the intermediate node 123 of the local area system 120. This is because a computing capability of a certain level or higher may be required for an operation of each of the API traffic managers 170-1 and 170-3. The API traffic managers 170-1 and 170-3 may be configured to collect traffic information from the API proxies 150-1 to 150-7, generate control information for decreasing communication traffic of at least one of the API proxies 150-1 to 150-7 on the basis of the collected traffic information, and deliver the generated control information to the API proxies 150-1 to 150-7. For example, when a frequency of occurrence of read/write requests for a specific physical resource increases to delay a response time of an API proxy (e.g., the API proxy 150-4) responsible for abstracting the resource, the API traffic managers 170-1 and 170-3 may change a configuration of the API proxies (150-1 to 150-7) to enable at least one other API proxy (e.g., the API proxy 150-6)) to process the request for the resource instead. As another example, the API traffic managers 170-1 and 170-3 may monitor traffic due to synchronization among the API proxies 150-1 to 150-7 and decrease the traffic according to a predetermined policy.

The above-described exemplary distributed API proxy system may reduce a bandwidth used in the network environment 100 such as an IoT environment, and eventually may save the cost of establishing a system that provides a service in the network environment 100. Operations of components of the distributed API proxy system will be described below.

Figure 2:
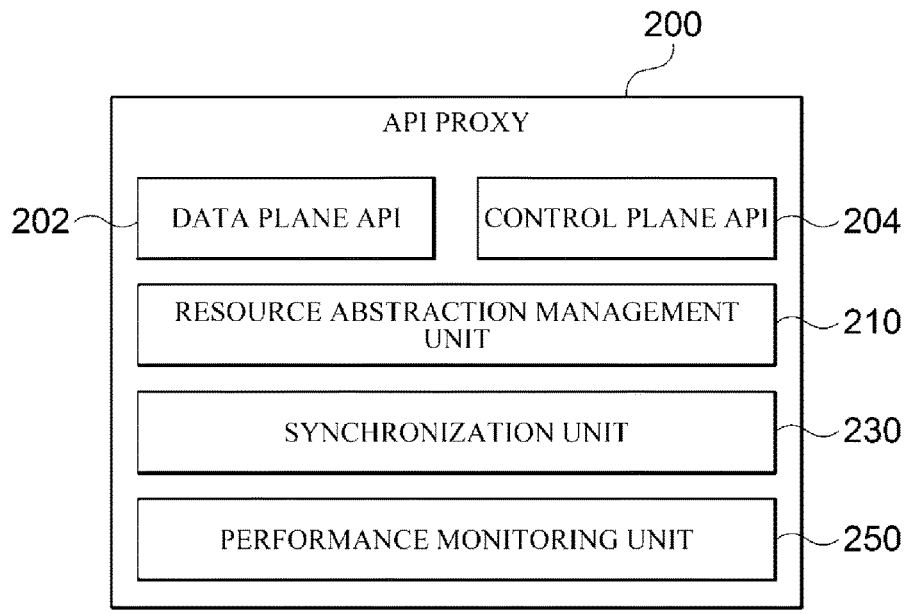
FIG. 2 is a diagram showing an API proxy according to an exemplary embodiment.

FIG. 2 is a diagram showing an API proxy according to an exemplary embodiment. In some embodiments, the API proxies 150-1 to 150-7 of FIG. 1 may be configured the same as an API proxy 200 of FIG. 2. The exemplary API proxy 200 may be implemented by hardware (e.g., a processor, a memory, and an input/output interface, such as a network interface, of a server device included in the back-end system 110 or a device in which a node included in the local area system 120 is implemented). The exemplary API proxy 200 includes a data plane API 202 and a control plane API 204.

The data plane API 202 provides an API for accessing the physical resource abstracted by the API proxy 200. For example, with respect to the abstracted resource, a component (e.g., a hardware device or another API proxy that is actually equipped with the abstracted resource) outside the API proxy 200 may generate (cache) data or read, update, or delete the cached data through the data plane API 202.

The control plane API 204 provides an API for monitoring a state of the API proxy 200 or setting a control parameter. The state to be monitored using the control plane API 204 may include whether the API proxy 200 operate as normal, computing resources such as a central processing unit (CPU) and a storage that may be used by the API proxy 200, and/or performance measurements generated by a performance monitoring unit 250 to be described below. The control parameter that may be set using the control plane API 204 may include a parameter stored/recorded by a resource abstraction management unit 210 or a synchronization unit 230 to be described below.

As shown in FIG. 2, the API proxy 200 may further include a resource abstraction management unit 210, a synchronization unit 230, and a performance monitoring unit 250.

The resource abstraction management unit 210 may abstract physical resources connected through the API proxy 200. For example, the resource abstraction may include converting a physical resource into an expression and/or a rule having a computer-interpretable format. In addition, the resource abstraction management unit 210 may store data (e.g., values cached during a predetermined time period until recently) cached for the abstracted resource in a storage space inside the resource abstraction management unit 210. In addition, the resource abstraction management unit 210 may store some internal parameters associated with the abstracted resource in an internal space. For example, the stored internal parameters may include an internal identifier and/or an external identifier (the internal identifier may be used inside the API proxy 200, and the external identifier may be used outside the API proxy 200) of the abstracted resource, a category of the abstracted resource, and/or a description of the abstracted resource.

Among physical resources maintained by the resource abstraction management unit 210, there may be a physical resource that needs synchronization between the API proxy 200 and an external component of the API proxy 200. The synchronization unit 230 may synchronize the API proxy 200 with the external component of the API proxy 200 regarding the physical resource. The synchronization unit 230 may record parameters for each resource indicating a synchronization target and a synchronization policy that are associated with the physical resource and may perform synchronization based on the record. The synchronization target may be an interface of an external component to be synchronized with the API proxy 200, for example, an interface of a hardware device actually equipped with the physical resource or a data plane API of another API proxy. The synchronization policy may include selecting a synchronization scheme. For example, the selected synchronization scheme may be an active scheme of directly requesting data associated with a resource to be synchronized, a passive scheme of awaiting delivery of the data, or a hybrid scheme of the active scheme and the passive scheme. When the selected synchronization scheme is the active scheme, a transmission interval of the request may also be designated by the synchronization policy. When the selected synchronization scheme is the hybrid scheme, a waiting time taken in transmitting the request according to the active scheme and/or the use of aggregation or compression of synchronization data for transmission may also be designated.

The performance monitoring unit 250 measures and records the performance of communication between the API proxy 200 and the external component. For example, the performance monitoring unit 250 may provide performance measurements such as a bandwidth, a round trip time (RTT), and an occurrence frequency of communication (e.g., a call of the data plane API 202, a call of the control plane API 204, and/or synchronization performed by the synchronization unit 250) causing traffic.

Figure 3:
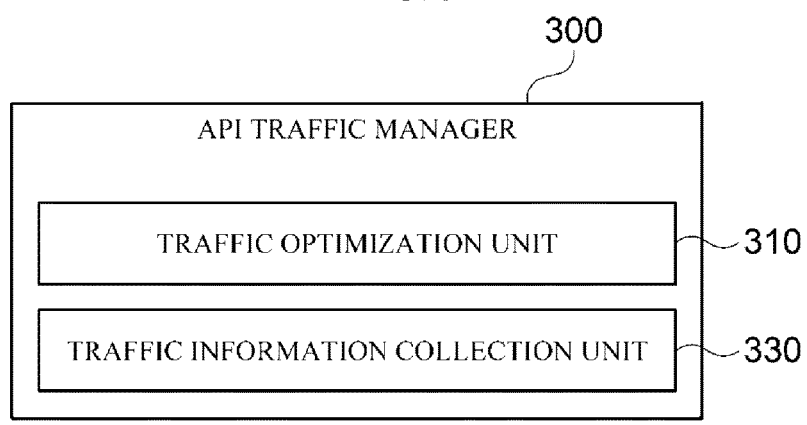
FIG. 3 is a diagram showing an API traffic manager according to an exemplary embodiment.

FIG. 3 is a diagram showing an API traffic manager according to an exemplary embodiment. In some embodiments, each of the API traffic managers 170-1 to 170-3 of FIG. 1 may be configured the same as the API traffic manager 300 of FIG. 3. The exemplary API traffic manager 300 may be implemented by hardware (e.g., a processor, a memory, and an input/output interface, such as a network interface, of a server device included in the back-end system 110 or an apparatus in which an intermediate node included in the local area system 120 is implemented).

As shown in FIG. 3, the API traffic manager 300 includes a traffic optimization unit 310 and a traffic information collection unit 330. In an exemplary embodiment, one or more of the traffic optimization unit 310 and the traffic information collection unit 330 are implemented via at least one central processing unit (CPU) or at least one hardware processor. The traffic information collection unit 330 collects predetermined traffic information using APIs (that is, a data plane API and a control plane API of each API proxy) of the plurality of API proxies. The collected traffic information may include at least one of data related to abstracted resources (e.g., data and/or identifiers cached for the abstracted resources), a synchronization target for each abstracted resource, a synchronization policy for each abstracted resource, and a performance measurement associated with traffic due to an API call and API proxy synchronization.

The traffic optimization unit 310 performs an optimization operation for reducing traffic caused by communication between the API proxies on the basis of traffic information collected by the traffic information collection unit 330. The optimization operation may include resetting a physical resource accessible through each API proxy, a synchronization target for the physical resource, and/or a synchronization policy for the physical resource.

According to some embodiments, the traffic optimization unit 310 may generate control information for reducing communication traffic of at least one of the plurality of API proxies based on the collected traffic information and may deliver the generated control information to the plurality of API proxies. The control plane API of each API proxy may be used to deliver the control information. According to the delivered control information, each API proxy may update some control parameters and/or perform another operation needed to change its own configuration.

As an example, the traffic optimization unit 310 may generate control information such that a second API proxy among the plurality of API proxies abstracts a physical resource that is accessible by a first API proxy among the plurality of API proxies. In particular, when a frequency of occurrence of a request delivered to the first API proxy in order to access the physical resource may be included in the aforementioned traffic information, and the occurrence frequency exceeds a processing capacity of the first API proxy, the control information may be generated. As such, the optimization operation of the traffic optimization unit 310 may have an aspect of assigning the abstraction of the physical resource. The aspect will be described below in more detail with reference to FIG. 4.

Figure 4:
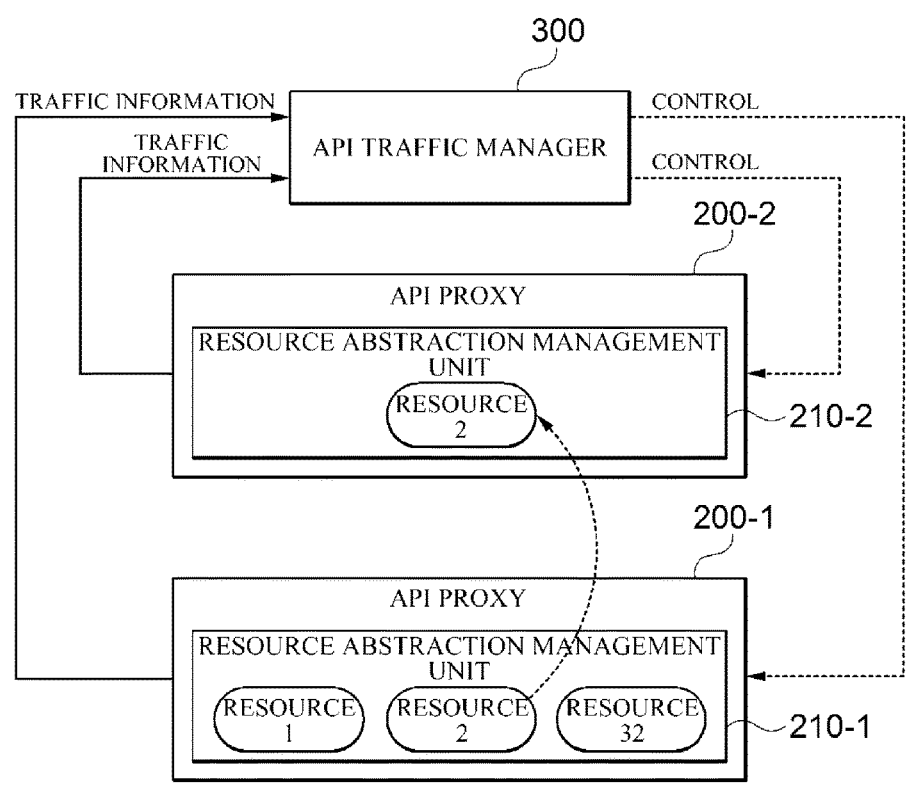
FIG. 4 is a diagram illustrating an example of sharing abstraction of physical resources among API proxies.

Additionally or alternatively, the traffic optimization unit 310 may generate control information such that synchronization policies of at least two API proxies are reset for the physical resources synchronized between the at least two API proxies among the plurality of API proxies. When the performance measurement of traffic caused by synchronization is included in the aforementioned traffic information, the control information may be generated based on the performance measurement. As such, the optimization operation of the traffic optimization unit 310 may have an aspect of minimizing traffic of synchronization between the API proxies. The aspect will be described below in more detail with reference to FIG. 5. FIG. 4 is a diagram illustrating an example of sharing abstraction of physical resources among API proxies.

An exemplary distributed API proxy system 400 includes API proxies 200-1 and 200-2 and an API traffic manager 300, which are distributed to a plurality of network apparatuses. In some embodiments, the API proxies 200-1 and 200-2 of FIG. 4 may be configured the same as the API proxy 200 of FIG. 2.

As shown in FIG. 4, the API proxy 200-1 may abstract and hold physical resources, for example, "resource 1," "resource 2," and "resource 3." If a frequency of occurrence of a request delivered to the API proxy 200-1 in order to access resource 2 increases over a certain level (e.g., when the number of API calls for accessing resource 2 during a determined time period exceeds a processing capacity of the API proxy 200-1), it may be difficult to process the request only using the API proxy 200-1. The traffic manager 300 may find out this situation and allow the API proxy 200-2 to process some of requests for resource 2.

Specifically, (the traffic information collection unit 330 of) the API traffic manager 300 may collect traffic information from the two API proxies 200-1 and 200-2. For example, the traffic information of the API proxy 200-1 may be configured to include a frequency of occurrence of an API call of the API proxy 200-1 (e.g., the total number of API calls and/or the number of API calls for each resource, which are/is received by the API proxy 200-1 during a certain time period). The traffic information of the API proxy 200-2 may be configured similarly to that described above.

On the basis of the collected traffic information, (the traffic optimization unit 310 of) the API traffic manager 300 may change the configurations of the API proxies 200-1 and 200-2 in order to allocate, to the API proxy 200-2, some of requests for accessing resource 2. The change may include setting a new physical resource accessible by each of the API proxies 200-1 and 200-2, a new synchronization target for the physical resource, and/or a new synchronization policy for the physical resource. For example, (the traffic optimization unit 310 of) the API traffic manager 300 may generate control information needed for the change of the configuration. The generated control information may be delivered from the API traffic manager 300 to the API proxies 200-1 and 200-2. The API proxies 200-1 and 200-2 may perform another operation for updating control parameters or changing their own configurations based on the control information, and subsequently may operate according to the changed configurations. For example, the API proxy 200-2 may initiate an abstract operation for resource 2. Subsequently, the two API proxies 200-1 and 200-2 may perform a synchronization operation on resource 2. As such, the abstraction of resource 2 may also be assigned to the API proxy 200-2, and processing of requests for resource 2 may be shared between the two API proxies 200-1 and 200-2.

Figure 5:
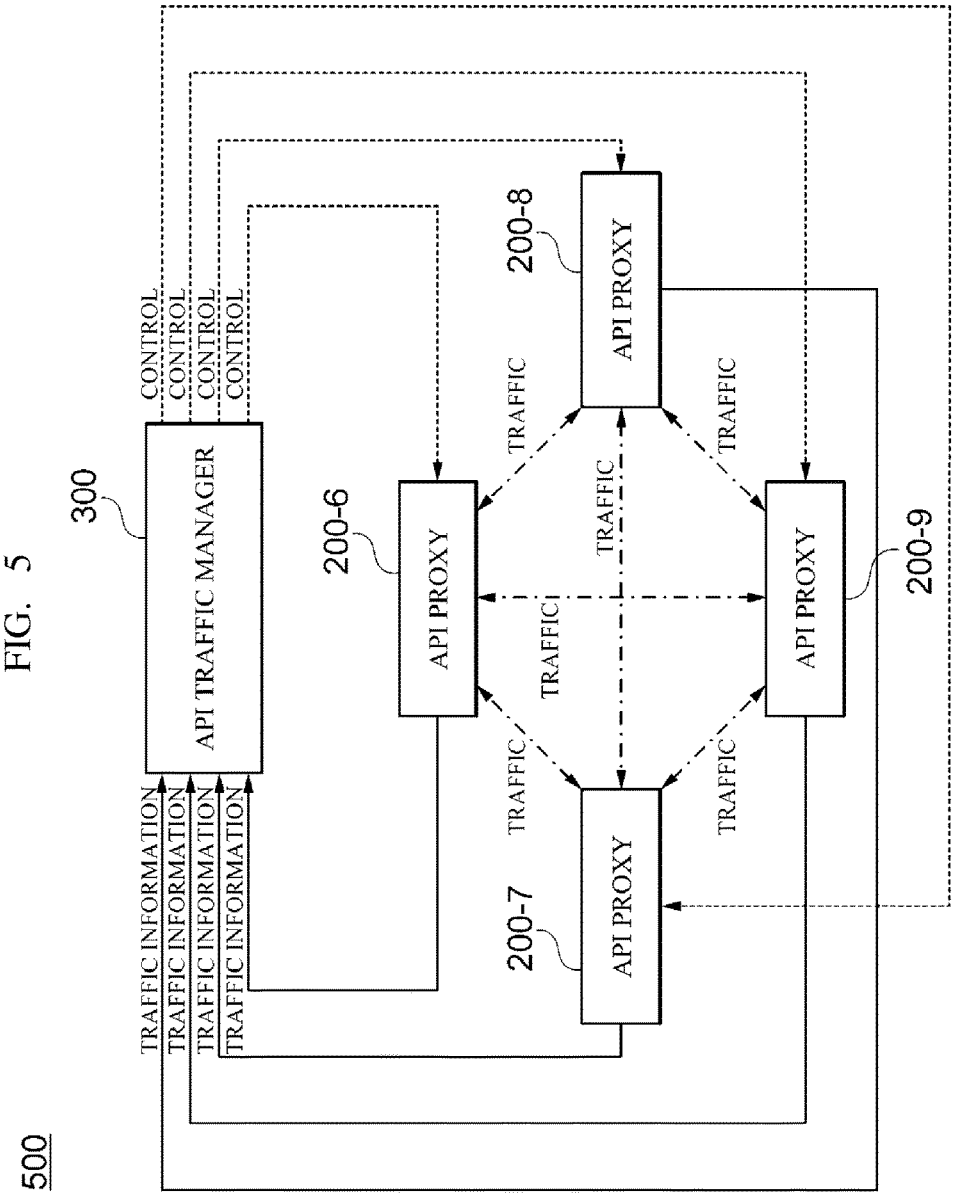
FIG. 5 is a diagram illustrating an example of decreasing traffic for synchronization among API proxies.

FIG. 5 is a diagram illustrating an example of decreasing traffic for synchronization among API proxies.

An exemplary distributed API proxy system 500 includes API proxies 200-6 to 200-9 and an API traffic manager 300, which are distributed to a plurality of network apparatuses. The API proxies 200-6 to 200-9 of FIG. 5 may be configured the same as the API proxy 200 of FIG. 2.

As an example, synchronization operations for the abstracted physical resources may be performed among the API proxies 200-6, 200-7, 200-8, and 200-9. As represented by a dashed line in FIG. 5, traffic may occur due to the synchronization operations.

(The traffic information collection unit 330 of) the API traffic manager 300 may collect traffic information from the API proxies 200-6, 200-7, 200-8, and 200-9. The traffic information of each of the API proxies 200-6, 200-7, 200-8, and 200-9 may include performance measurements associated with synchronization traffic of the API proxies 200-6, 200-7, 200-8, and 200-9. For example, the API traffic manager 300 may acquire, from the API proxy 200-6, a performance measurement of synchronization traffic between the API proxy 200-6 and the API proxy 200-7, a performance measurement of synchronization traffic between the API proxy 200-6 and the API proxy 200-8, and a performance measurement of synchronization traffic between the API proxy 200-6 and the API proxy 200-9. In addition, the API traffic manager 300 may acquire, from the API proxy 200-7, a performance measurement of synchronization traffic between the API proxy 200-7 and the API proxy 200-6, a performance measurement of synchronization traffic between the API proxy 200-7 and the API proxy 200-8, and a performance measurement of synchronization traffic between the API proxy 200-7 and the API proxy 200-9. Likewise, the API traffic manager 300 may acquire respective synchronization traffic performance measurements from the API proxy 200-8 and the API proxy 200-9.

On the basis of the collected traffic information, (the traffic optimization unit 310 of) the API traffic manager 300 may change the configurations of the API proxies 200-6, 200-7, 200-8, and 200-9 in order to minimize synchronization traffic that occurs among the API proxies 200-6, 200-7, 200-8, and 200-9. The change may include setting a new synchronization policy for the physical resource. For example, (the traffic optimization unit 310 of) the API traffic manager 300 may generate control information needed for the change of the configuration. The generated control information may be delivered from the API traffic manager 300 to the API proxies 200-6, 200-7, 200-8, and 200-9. The API proxies 200-6, 200-7, 200-8, and 200-9 may update their own synchronization policies based on the control information. New synchronization policies that are optimized may reduce the synchronization traffic between the API proxies 200-6, 200-7, 200-8, and 200-9 while maintaining a delay time taken in synchronization between the API proxies 200-6, 200-7, 200-8, and 200-9 at a level required to operate an application.

Figure 6:
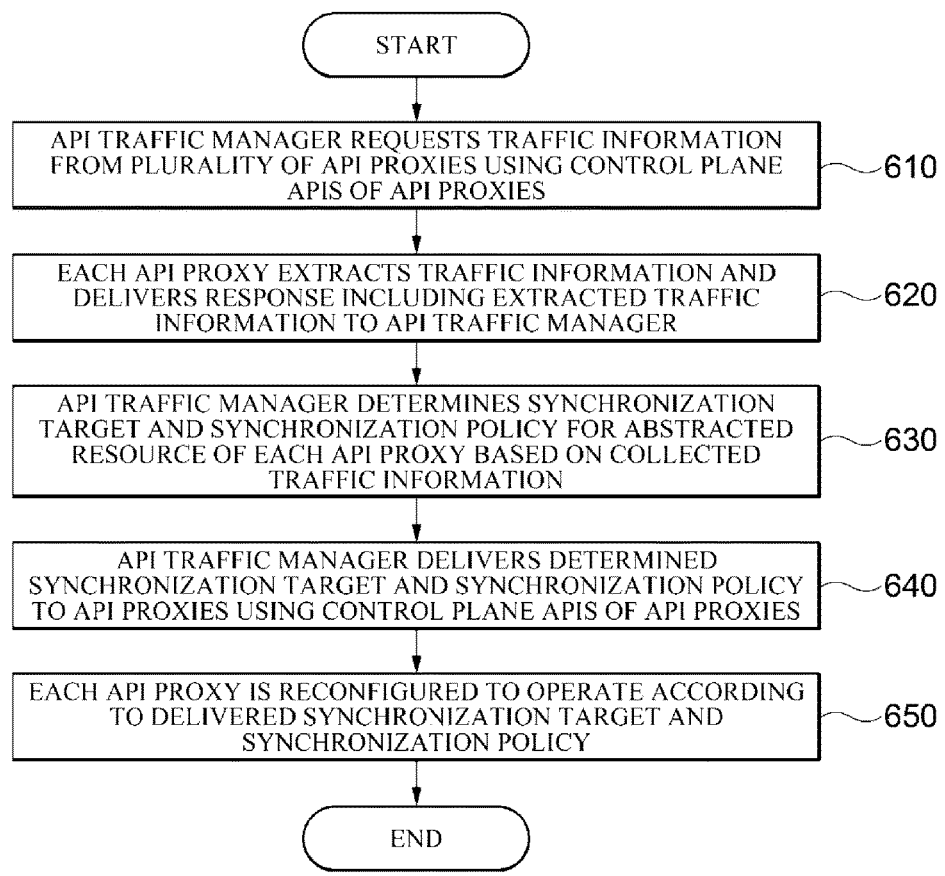
FIG. 6 is a diagram showing a process of optimizing communication traffic of a distributed API proxy according to an exemplary embodiment.

FIG. 6 is a diagram showing a process of optimizing communication traffic of a distributed API proxy according to an exemplary embodiment. For example, operations of the process 600 may be performed by the distributed API proxy system (e.g., the distributed API proxy system 400 of FIG. 4 or the distributed API proxy system 500 of FIG. 5) according to a distributed API proxy system according to an exemplary embodiment.

After a start operation, the process 600 proceeds to operation 610. In operation 610, an API traffic manager of the distributed API proxy system requests traffic information from a plurality of API proxies in the distributed API proxy system. The request may be delivered using control plane APIs of the API proxies.

In operation 620, each AP proxy extracts its own traffic information and delivers a response including the extracted traffic information to the API traffic manager.

In operation 630, the API traffic manager determines a synchronization target and a synchronization policy for an abstracted resource of each API proxy based on collected traffic information.

In operation 640, the API traffic manager delivers the determined synchronization target and synchronization policy to the API proxies. The determined synchronization target and synchronization policy may be delivered using the control plane APIs of the API proxies.

In operation 650, the API proxy is reconfigured to operate according to the delivered synchronization target and synchronization policy.

As shown in FIG. 6, the process 600 indicates one operating cycle during which the API traffic manager collects traffic information from the API proxies and applies newly established synchronization target and synchronization policy to the API proxies. The assigning of resource abstraction and the minimizing of synchronization traffic, which are described above, may be performed during the operating cycle.

Figure 7:
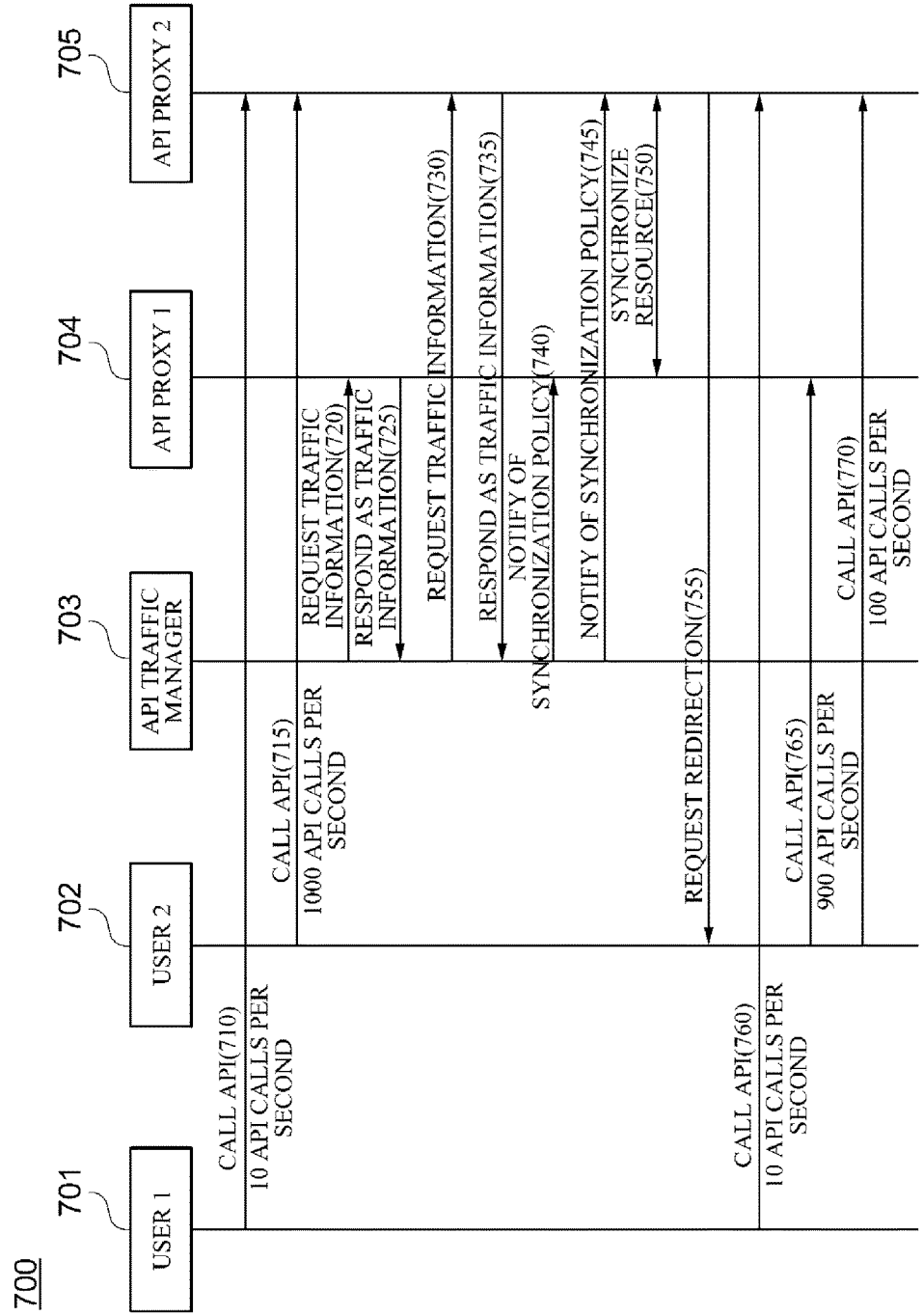
FIG. 7 is a diagram showing a process of managing traffic in a distributed API proxy system according to an exemplary embodiment.

FIG. 7 is a diagram showing a process of managing traffic in a distributed API proxy system according to an exemplary embodiment.

As shown in FIG. 7, a distributed API system in which operations of an exemplary process 700 are performed may include at least one API traffic manager (e.g., an API traffic manager 703) and a plurality of API proxies (e.g., API proxy 1 (hereinafter referred to as a first API proxy) 704 and API proxy 2 (hereinafter referred to as a second API proxy) 705). The plurality of API proxies may be provided with different computing resources. For example, the first API proxy 704 may be implemented by a hardware processor having an operating speed of 1 GHz, and the second API proxy 705 may be implemented by a hardware processor having an operating speed of 10 MHz. A hardware processor for implementing the API traffic manager 703 may have an operating speed of 1 GHz or higher. A plurality of users (e.g., user 1 (hereinafter referred to as a first user) 701 and user 2 (hereinafter referred to as a second user) 702) may acquire data related to a predetermined physical resource from a specific API proxy (e.g., the first API proxy 704 and the second API proxy 705) using an application.

In operation 710, when the first user 701 provides an input for accessing the second API proxy 705 to an application, the second API proxy 705 receives an API call (e.g., 10 calls per second) from the application.

In operation 715, when the second user 702 provides an input for accessing the second API proxy 705 to another application, the second API proxy 705 receives an API call (e.g., 1000 calls per second) from the application. In the above mentioned example, the number of API calls may exceed a processing capacity of the second API proxy 705.

In operation 720, the API traffic manager 703 requests traffic information from the first API proxy 704. In operation 725, the first API proxy 704 responds to the API traffic manager 703 as its own traffic information.

In operation 730, the API traffic manager 703 requests traffic information from the second API proxy 705. In operation 725, the second API proxy 705 responds to the API traffic manager 703 as its own traffic information.

As described above with reference to FIGS. 3 and 4, on the basis of the traffic information collected through operations 725 and 735, the API traffic manager 703 may allow abstraction of some of physical resources accessible through the second API proxy 705, to which the API calls are concentrated, to be assigned to the first proxy 704. In addition, the API traffic manager 703 may establish a synchronization policy for optimizing synchronization between the first API proxy 704 and the second API proxy 705 according to the assignment.

In operation 740, the API traffic manager 703 notifies the established synchronization policy to the first API proxy 704. In operation 745, the API traffic manager 703 notifies the established synchronization policy to the second API proxy 705. For example, the API traffic manager 703 may generate control information for applying the established synchronization policy to the first API proxy 704 and the second API proxy 705 and delivers the generated information to the first API proxy 704 and the second API proxy 705. Depending on the delivered control information, separate synchronization policies may be set for the first API proxy 704 and the second API proxy 705.

In operation 750, the first API proxy 704 and the second API proxy 705 perform synchronization on a resource abstracted by the first API proxy 704 according to the above-described assignment (hereinafter referred to as an "assigned resource").

In operation 755, the second API proxy 705 may deliver a redirection request message to an application of the second user 702 in order to request the second user 702 to distribute API calls for the assigned resource.

In operation 760, the second API proxy 705 receives the same number (e.g., 10 per second) of API calls as in operation 710 from an application of the first user 701. Referring to operations 765 and 770, the second API proxy 705 receives a smaller number of API calls from the second user 702 than in operation 715, and the first API proxy 704 receives API calls from the second user 702. For example, in operation 765, the first API proxy 704 may receive 900 API calls per second for the assigned resource, and the second API proxy 705 may receive 100 API calls per second for the assigned resource. As such, traffic caused from the second user 702 may be shared between the first API proxy 704 and the second API proxy 705.

Embodiments of the present disclosure may include a computer-readable storage medium including a program for performing methods described in this specification on a computer. The computer-readable storage medium may include a program instruction, a local data file, a local data structure, or a combination thereof. The computer-readable storage medium may be designed and configured only for the present disclosure. Examples of the computer-readable storage medium include a magnetic medium, such as a hard disk, a floppy disk, and a magnetic tape, an optical recording medium, such as a CD-ROM and a DVD, a magneto-optical medium, such as a floptical disk, and a hardware device specially configured to store and perform a program instruction, such as a ROM, a RAM, and a flash memory. Examples of the program instruction include a high-level language code executable by a computer with an interpreter, in addition to a machine language code made by a compiler.

According to some embodiments, it is possible to provide the distributed API proxy system applicable to a network environment such as an Internet of Things (IoT) environment.

According to some embodiments, a system that provides a service in the network environment such as the Internet of Things (IoT) environment may have high visibility and an available bandwidth that is reduced through optimization of communication traffic.

According to some embodiments, it is possible to save the cost needed to establish and manage the service system.

Although exemplary embodiments of the disclosure has been described in detail, it will be understood by those skilled in the art that various changes may be made without departing from the spirit or scope of the disclosure. Thus, the scope of the present disclosure is to be determined by the following claims and their equivalents, and shall not be restricted or limited by the foregoing detailed description.

What is claimed is:

1. An apparatus for managing application programming interface (API) traffic, the apparatus comprising at least one hardware processor to execute program codes to perform:

collecting traffic information from a plurality of API proxies distributed to a plurality of networked apparatuses such that physical resources of the networked apparatuses are abstracted, thereby providing access to the abstracted physical resources via the plurality of API proxies;

generating control information for decreasing communication traffic of at least one of the plurality of API proxies based on the collected traffic information:

delivering the generated control information to the plurality of API proxies, wherein the generating comprises generating the control information based on the collected traffic information such that a second API proxy among the plurality of API proxies abstracts a first physical resource abstracted by a first API proxy among the plurality of API proxies;

performing a synchronization of the first API proxy and the second API proxy wherein:

the control information causes a synchronization policy of at least the first API proxy and the second API proxy to be reset for the first physical resource; and the synchronization policy comprises selecting a scheme of performing a synchronization, and the selected scheme comprises an active scheme of directly requesting data associated with the first physical resource, a passive scheme of awaiting delivery of the data, or a hybrid scheme of the active scheme and the passive scheme; and updating control parameters of at least the first API proxy and the second API proxy based on the collected traffic information.

2. The apparatus of claim 1, wherein the generating comprises generating the control information based on the collected traffic information such that the control information is configured to cause a synchronization policy of each of at least two API proxies among the plurality of API proxies to be reset for a first physical resource synchronized between the at least two API proxies.

3. The apparatus of claim 2, wherein the collected traffic information comprises a performance measurement of traffic caused by a synchronization.

4. The apparatus of claim 3, wherein the performance measurement comprises at least one of a bandwidth, a round trip time (RTT), and an occurrence frequency of the traffic.

5. The apparatus of claim 1, wherein the collected traffic information comprises an occurrence frequency of a request delivered to the first API proxy in order to access the first physical resource.

6. The apparatus of claim 5, wherein the control information is generated when the occurrence frequency exceeds a processing capacity of the first API proxy.

7. The apparatus of claim 1, wherein, after the second API proxy abstracts the first physical resource, the first API proxy and the second API proxy are synchronized regarding the first physical resource.

8. The apparatus of claim 1, wherein each of the plurality of API proxies comprises a data plane API that provides an API applicable to the access of the abstracted physical resources and a control plane API that provides an API applicable to the collection of the traffic information and the delivery of the control information.

9. The apparatus of claim 1, wherein the control information is used to reset at least one of a physical resource accessible by each of the plurality of API proxies, a synchronization target for the accessible physical resource, and a synchronization policy for the accessible physical resource.

10. A method of managing distributed API proxy traffic, the method comprising:
collecting traffic information from a plurality of API proxies distributed to a plurality of networked apparatuses such that physical resources of the networked apparatuses are abstracted, thereby providing access to the abstracted physical resources via the plurality of API proxies;
generating control information for decreasing communication traffic of at least one of the plurality of API proxies based on the collected traffic information; and
delivering the generated control information to the plurality of API proxies, wherein the generating comprises generating the control information based on the collected traffic information such that a second API proxy among the plurality of API proxies abstracts a first physical resource abstracted by a first API proxy among the plurality of API proxies;
performing a synchronization of the first API proxy and the second API proxy wherein:
the control information causes a synchronization policy of at least the first API proxy and the second API proxy to be reset for the first physical resource; and
the synchronization policy comprises selecting a scheme of performing a synchronization, and the selected scheme comprises an active scheme of directly requesting data associated with the first physical resource, a passive scheme of awaiting delivery of the data, or a hybrid scheme of the active scheme and the passive scheme; and updating control parameters of at least the first API proxy and the second API proxy based on the collected traffic information.

11. The method of claim 10, wherein the generating comprises generating the control information based on the collected traffic information such that the control information is configured to cause a synchronization policy of each of at least two API proxies among the plurality of API proxies to be reset for a first physical resource synchronized between the at least two API proxies.

12. The method of claim 11, wherein the collected traffic information comprises a performance measurement of traffic caused by a synchronization.

13. The method of claim 12, wherein the performance measurement comprises at least one of a bandwidth, a round trip time (RTT), and an occurrence frequency of the traffic.

14. The method of claim 10, wherein the collected traffic information comprises an occurrence frequency of a request delivered to the first API proxy in order to access the first physical resource.

15. The method of claim 14, wherein the control information is generated when the occurrence frequency exceeds a processing capacity of the first API proxy.

16. The method of claim 10, wherein, after the second API proxy abstracts the first physical resource, the first API proxy and the second API proxy are synchronized regarding the first physical resource.

17. The method of claim 10, wherein each of the plurality of API proxies comprises a data plane API that provides an API applicable to the access of the abstracted physical resources and a control plane API that provides an API applicable to the collection of the traffic information and the delivery of the control information.

18. The method of claim 10, wherein the control information is used to reset at least one of a physical resource accessible by each of the plurality of API proxies, a synchronization target for the accessible physical resource, and a synchronization policy for the accessible physical resource.

19. A non-transitory computer-readable storage medium storing a computer program for executing the method of claim 10.

20. A distributed application programming interface (API) proxy system comprising:
a plurality of API proxies distributed to a plurality of networked apparatuses such that physical resources of the networked apparatuses are abstracted, thereby providing access to the abstracted physical resources via the plurality of API proxies; and
at least one hardware processor to execute:
an API traffic manager configured to collect traffic information from the plurality of API proxies, to generate control information for decreasing communication traffic of at least one of the plurality of API proxies based on the collected traffic information, and to deliver the generated control information to the plurality of API proxies;
wherein API traffic manager generates the control information based on the collected traffic information such that a second API proxy among the plurality of API proxies abstracts a first physical resource abstracted by a first API proxy among the plurality of API proxies; and
wherein after the second API proxy abstracts the first physical resource, the API traffic manager further configured to perform a synchronization of the first API proxy and the second API proxy wherein:

the control information causes a synchronization policy of at least the first API proxy and the second API proxy to be reset for the first physical resource; and the synchronization policy comprises selecting a scheme of performing a synchronization, and the selected scheme comprises an active scheme of directly requesting data associated with the first physical resource, a passive scheme of awaiting delivery of the data, or a hybrid scheme of the active scheme and the passive scheme; and the API traffic manager updating control parameters of at least the first API proxy and the second API proxy based on the collected traffic information.

21. The distributed API proxy system of claim 20, wherein the plurality of networked apparatuses comprise:

a gateway device communicably connected with a back-end device; and a terminal device communicably connected with the gateway device, thereby further being communicably connected with the back-end device through the gateway device.

22. The distributed API proxy system of claim 21, wherein the plurality of networked apparatuses further comprise the back-end device.

23. The distributed API proxy system of claim 21, wherein the API traffic manager is disposed in the back-end device.

24. The distributed API proxy system of claim 21, wherein the plurality of networked apparatuses further comprise an intermediate device communicably connected with the gateway device and the terminal device, and communicably connected with the back-end device through the gateway device, the intermediate device has a higher instructions per second (IPS) rate than the terminal device, and the API traffic manager is disposed in the intermediate device.

25. The distributed API proxy system of claim 20, wherein the API traffic manager is disposed in one of the plurality of networked apparatuses.

26. The distributed API proxy system of claim 20, wherein the plurality of networked apparatuses are associated with an Internet of Things (IoT).

\* \* \* \* \*